(12) United States Patent
Unger et al.

(10) Patent No.: US 6,230,326 B1
(45) Date of Patent: May 8, 2001

(54) METHOD AND APPARATUS FOR INITIALIZATION OF A CABLE MODEM

(75) Inventors: J. David Unger, Windham, NH (US); John Ulm, Pepperell, MA (US); Eugene E. O'Neil, Jr., Bow; Wilson Sawyer, E. Hampstead, both of NH (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/126,557

(22) Filed: Jul. 30, 1998

(51) Int. Cl.$^7$ .................................................. H04N 7/173
(52) U.S. Cl. ............................ 725/111; 725/117; 725/118
(58) Field of Search .................................. 348/10, 12, 13, 348/6; 455/226.3, 62, 324, 5.1; 725/111, 117, 118

(56) References Cited

U.S. PATENT DOCUMENTS

| | | | |
|---|---|---|---|
| 5,130,974 | * 7/1992 | Kawamura et al. | 360/16 |
| 5,689,506 | * 11/1997 | Chiussi et al. | 370/388 |
| 5,790,806 | * 8/1998 | Koperda | 395/200.82 |
| 5,883,901 | * 3/1999 | Chiu et al. | 370/508 |
| 5,894,479 | * 4/1999 | Mohamed | 370/401 |
| 5,917,822 | * 6/1999 | Lyles et al. | 370/395 |
| 5,963,557 | * 10/1999 | Eng | 370/432 |
| 5,986,691 | * 11/1999 | Henderson | 348/12 |
| 6,011,548 | * 1/2000 | Thacker | 348/12 |
| 6,018,767 | * 1/2000 | Fijolek et al. | 709/219 |
| 6,044,107 | * 3/2000 | Gatherer et al. | 375/222 |

OTHER PUBLICATIONS

Cable Television Laboratories, Inc., Ref: Radio Frequency Interface Specification. SP–RFI–104–980724, Mar. 1997.*

* cited by examiner

Primary Examiner—Andrew Faile
Assistant Examiner—Hai V. Tran
(74) Attorney, Agent, or Firm—Blakely Sokoloff Taylor & Zafman LLP

(57) ABSTRACT

A method and apparatus for initialization and operation of cable modems comprising initializing the cable modems over management channels and transferring the cable modems to a data channel for operation. Initialization over a management channel overcomes certain prior art constraints associated with initialization over the data channel.

12 Claims, 7 Drawing Sheets

METHOD AND APPARATUS FOR INITIALIZATION OF A CABLE MODEM

BACKGROUND OF THE INVENTION

1. Field of the Invention

The present invention relates to the field of networking and more specifically to provide information over a cable modem network.

2. Description of the Related Art

In a cable modem network, information is carried over a cable from a cable modem termination system (CMTS) to a plurality of cable modems (CMs). The CMs are coupled in communication with the CMTS to receive information on a so-called "downstream" channel and to communicate information to the CMTS on a so-called "upstream" channel. Particular characteristics (e.g., frequency, power levels, etc,) of the upstream channel are determined at the time the CM is initialized.

FIG. 5 illustrates an implementation in which a single downstream channel 501 is utilized in conjunction with four upstream channels 511–514. The four upstream channels 511–514 may be, for example, separate fibers serving four geographically separate communities of CMs 521–524. The Radio Frequency Interface Specification, Data-over-cable Service Interface Specifications, SP-RFI-I03-980202 available from the Cable Television Laboratories, Inc. (hereinafter, the "MCNS specification") describes a basic initialization process for CMs. Initialization of CMs in an implementation as shown in FIG. 5 is described in greater detail in Appendix G of the MCNS specification.

As is discussed in the MCNS specification, the CMTS 531 periodically broadcasts upstream channel descriptors (UCDs) on the downstream channel 501 in order to describe characteristics of upstream channels to the CMs. As part of the initialization process, a CM waits for a UCD in order to obtain transmission parameters for the upstream channel. When the CM receives a UCD and determines that the transmission parameters are suitable, it waits for a SYNC message from the CMTS in order to achieve time synchronization with the CMTS. It then waits for a bandwidth allocation map for the selected channel. The allocation map allocates periods in the bandwidth to various types of data transmissions. One of these may be an "initial maintenance" request. It is during this initial maintenance request time slot that a new CM may transmit what is termed a "ranging request" which is used to determine network delay. In response to the ranging request, the CMTS transmits a "ranging response" which, may among other parameters, include a parameter redirecting the CM to an appropriate upstream channel. As is discussed in Appendix G to the MCNS specification, this topology imposes a number of constraints including:

- All of the upstream channels 511–514 must operate at the same frequency because, as a result of the CM essentially choosing a UCD at random (typically, the first UCD received during the initialization cycle), it would be transmitting at the wrong frequency if this constraint were not imposed.
- All of the upstream channels 511–514 must operate at the same symbol rate because the CMTS would otherwise be not be aware of the symbol rate of the transmissions and would be unable to demodulate the ranging requests;
- All of the initial maintenance opportunities must be aligned because the CMTS must be prepared to receive a ranging request at the time designated in the allocation map; and
- All initial maintenance opportunities must use the same burst characteristics so that the CMTS can demodulate the ranging request.

These constraints raise a number of issues. For example, when there is excessive ingress (noise and RF interference) on a particular channel, it is desirable to change the frequency of the channel. However, it may be that the ingress is only occurring on one of channels 511–514 at a given frequency because of particular characteristics (environmental, etc.) of that channel. However, as a result of the first constraint, if the frequency of one channel is changed, the frequency of all channels must be changed. Thus, not only is the overhead of needing to change the frequency of multiple upstream channels imposed by this constraint, but the likelihood of experiencing ingress at particular frequency is increased because ingress on any channel requires the making a change.

Thus, what is needed is a method and apparatus relieving as many as of the above-recited constraints as possible. It would be desirable if such a method and apparatus allowed operation of a cable modem plant in accordance with the MCNS specification.

SUMMARY OF THE INVENTION

A method and apparatus for initializing cable modems which overcomes certain constraints imposed by prior implementations is described. In the described embodiment, the cable modem termination system transmits UCDs which include management channel information (and the associated maps) only for a management channel and not for normal data channels. The cable modem perform initialization over the management channel and are then transferred to a data channel for operation.

In the described embodiment, an extra (N+1) receiver is used for communication on the management channel.

Figure 1:
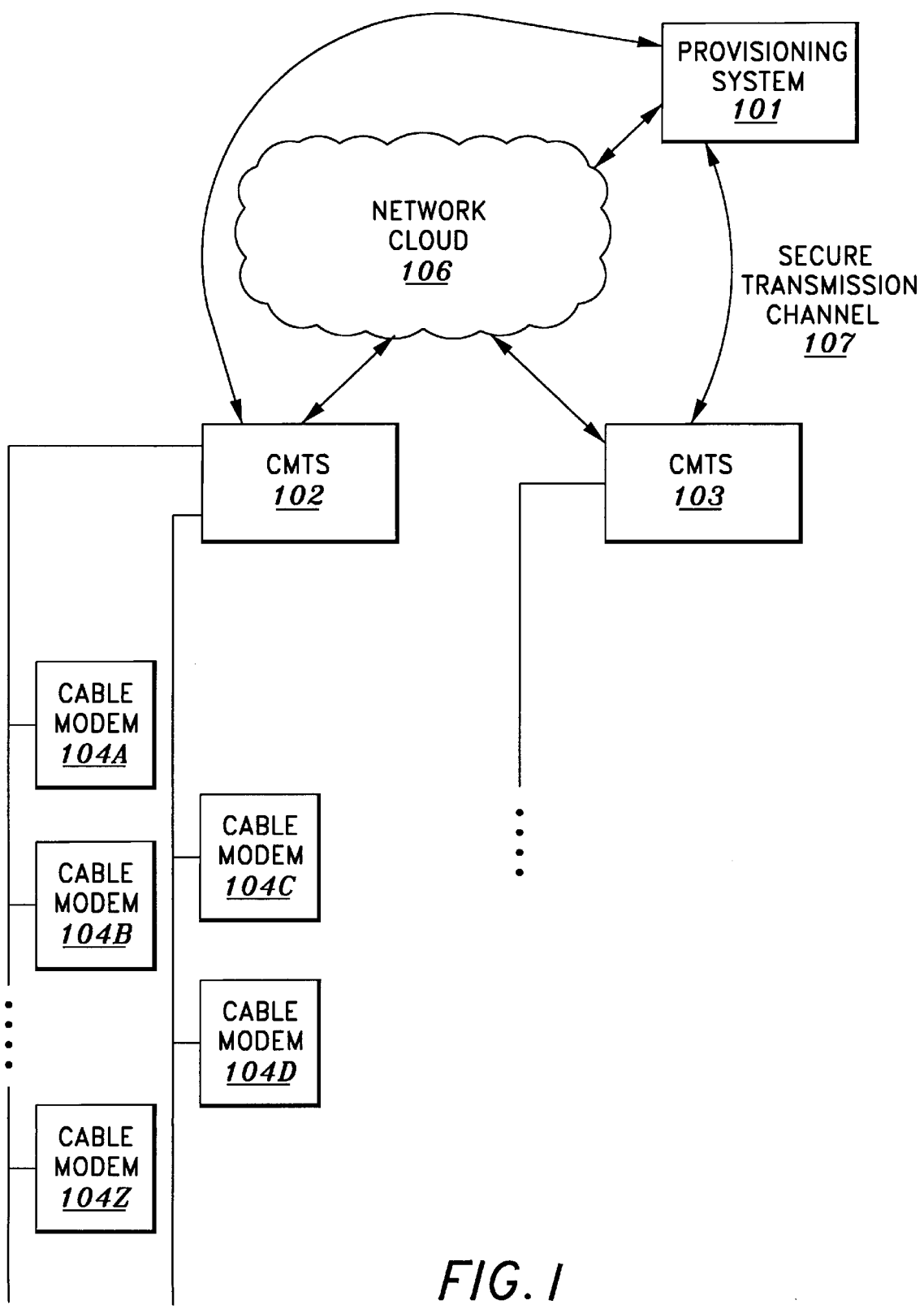
FIG. 1 illustrates a cable modem network as may implement the present invention.
Figure 3:
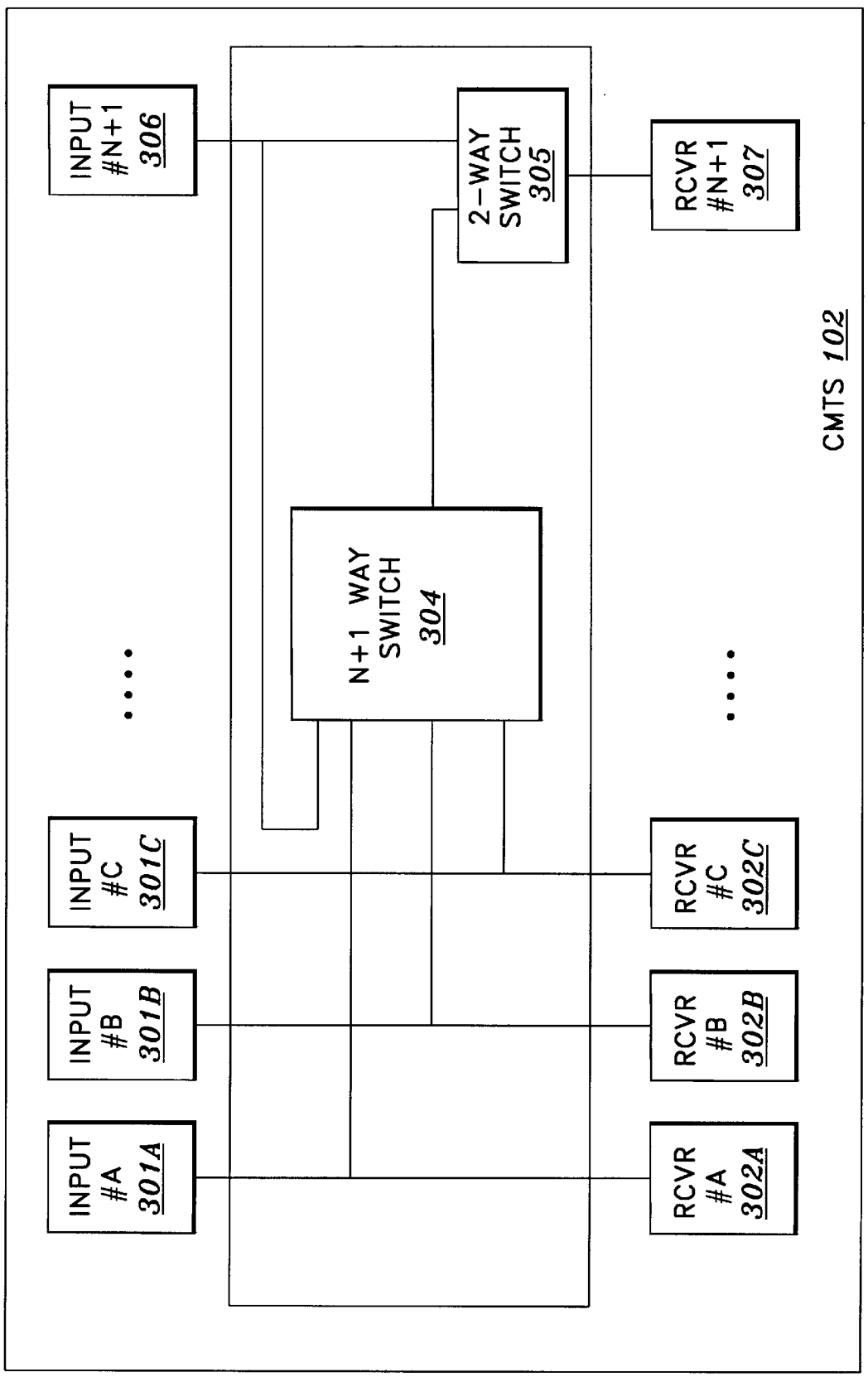
FIG. 3 illustrates a spectrum analyzer as may be implemented by the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

Overview of a Cable Modem Network as may Implement the Present Invention

FIG. 1 illustrates an overall diagram of a cable modem network as may utilize the present invention.

In the described embodiment, the network comprises a provisioning system 101, a cable modem termination system (CMTS) 102 coupled in communication with the provisioning system over a network 106 and a plurality of cable modems (CM) 104A to 104Z over one or more communications channels (in the figure, the CMs are illustrated as being coupled over two communications channels). The CMTS is sometimes referred to in the art as a cable modem head end. The CMTS instructs the CMs regarding the appropriate frequency, power levels, times for transmission, modulation type, error correction type, etc. over a downstream communication channel and the CMs communicate information to the CMTS over an upstream communication channel.

In addition to communication over the network cloud 106, the provisioning system is coupled to communicate with the CMTS over a secure communication channel 108. The secure communication channel may be any of a number of communication channels. For example, rather than providing a separate communication channel, information may be encrypted by the provisioning server 101 and decrypted by the CMTS 102. Alternatively, a separate physical channel may be provided or a manual means of communication information using a trusted courier may be utilized.

The network cloud 106 may be any of a number of conventional networks. In the described embodiment, an IP network is utilized. This network does not need to be a secure network.

A plurality of CMTS devices (such as CMTS 103) may be coupled in communication with a provisioning system 101. As illustrated, CMTS 103 is coupled in communication with the provisioning system over network cloud 106 and over secure transmission channel 107.

The N+1 Channel Architecture

Figure 2:
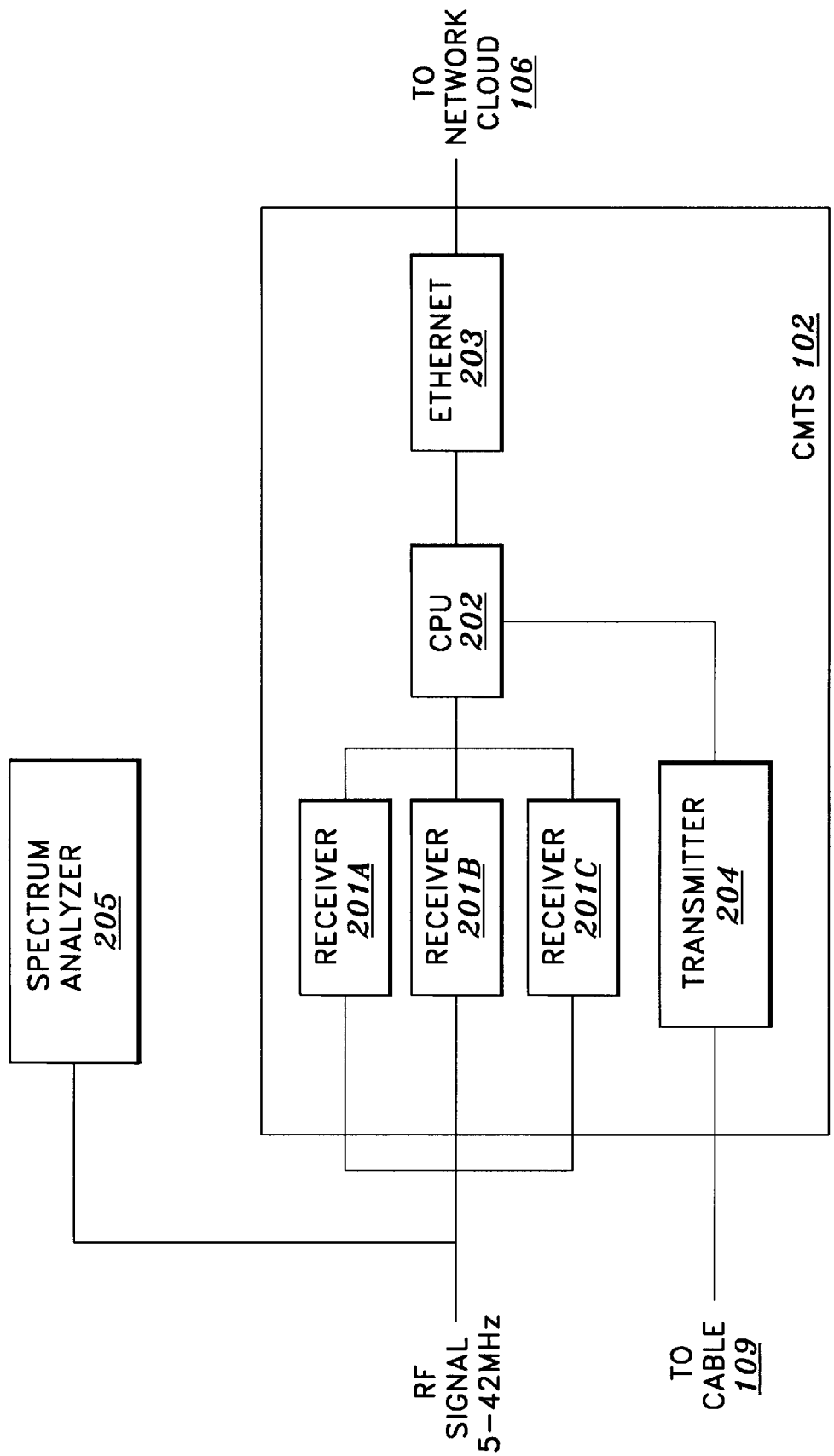
FIG. 2 illustrates a prior art spectrum analyzer.

As discussed above, an issue exists because there may be ingress (noise and RF interference) into the cable modem channel 109 from various sources such as outside radio signals and the like. It is would be beneficial to find a channel which is ingress-free or as ingress-free as possible. It would further be beneficial to find such a channel using a method and apparatus which is as automated as possible requiring little if any user intervention. FIG. 2 illustrates a prior art system for selecting a channel. In the prior art system, the CMTS 102 receives an RF signal on a frequency from 5–42 MHz on cable modem 109. The received signal is fed to receivers 201A–C which are controlled by CPU 202. Each of the receivers may receive signals from one or more of cable modems 104A–Z. Signals are transmitted to the cable modem 109 over transmitter 204. The CPU 202 also provides an interface to the network cloud 106 through ethernet interface 203. A spectrum analyzer 205 is used to analyze the various frequencies available for transmission on the cable modem 109 in order to select a desirable frequency channel. Once the desired frequency channel is selected, all cable modems 104A–Z and the CMTS 102 must be configured to begin transmitting and receiving on the selected frequency. Because the communication between the CMTS and the CMs uses time division multiplexing, the process typically requires temporarily shutting down service to all cable modems 104A–Z, reprogramming each of the modems to the new frequency during their individual time slots, and then restarting the system using the new frequency.

FIG. 3 illustrates applicable components of a cable modem termination system as may implement the present invention. As is illustrated by FIG. 3, the embodiment provides a N+1 input 306 and and N+1 receiver 307. Thus, in an embodiment of a cable modem termination system supporting, e.g., 24 inputs, a total of 25 inputs and receivers are utilized. As will be described, this advantageously allow the "extra" receiver 307 to act as a diagnostics receiver, to act as a backup receiver in the event of a failure of one of the other receivers, to act as a spectrum analyzer, or to allow for temporary operation of two receivers on two different frequencies on the same input port which allows for migration of cable modems from one modem to another without need to shut down the cable plant as has been characteristic of prior art systems.

Each of the receivers 302A–C is coupled to an input 301A–C. Although the CMTS 102 is illustrated with 3 inputs 301A–C, in alternative embodiments there may be greater or fewer inputs without departure from the present invention. In addition to being coupled to the receivers 302A–C, each of the inputs is also coupled as input to switch 304. In addition, input 306 is coupled as an input to switch 304. Thus, any of inputs 301A–C or 306 may be selected as the output of switch 304.

The output of switch 304 is coupled with 2-way switch 305. Input 306 is also coupled as a second input to 2-way switch 305. The output of 2-way switch 305 is coupled to receiver 307.

Thus, it will be appreciated that receiver 307 may receive and demodulate the same data signal which is received by any of receivers 302AC. In this mode, receiver 307 may act as a diagnostic receiver or, in the event of a failure of any of receivers 302A–C, as a backup receiver. When acting in a diagnostic or backup mode switch 304 is set to switch through the input signal from the input 301A–C for which diagnosis or backup is desired and switch 305 is set to switch through the input from switch 304.

In addition, receiver 306 may act as a spectrum analyzer by scanning any part of the input signal spectrum. In the described embodiment, the input signal spectrum in generally in the range of 5–42 MHz. By analyzing the input signal spectrum, a frequency with low ingress (low noise and RF interface) may be found and selected for use. When acting as a spectrum analyzer, switch 305 is set to switch through the input signal received on input 306.

Figure 4:
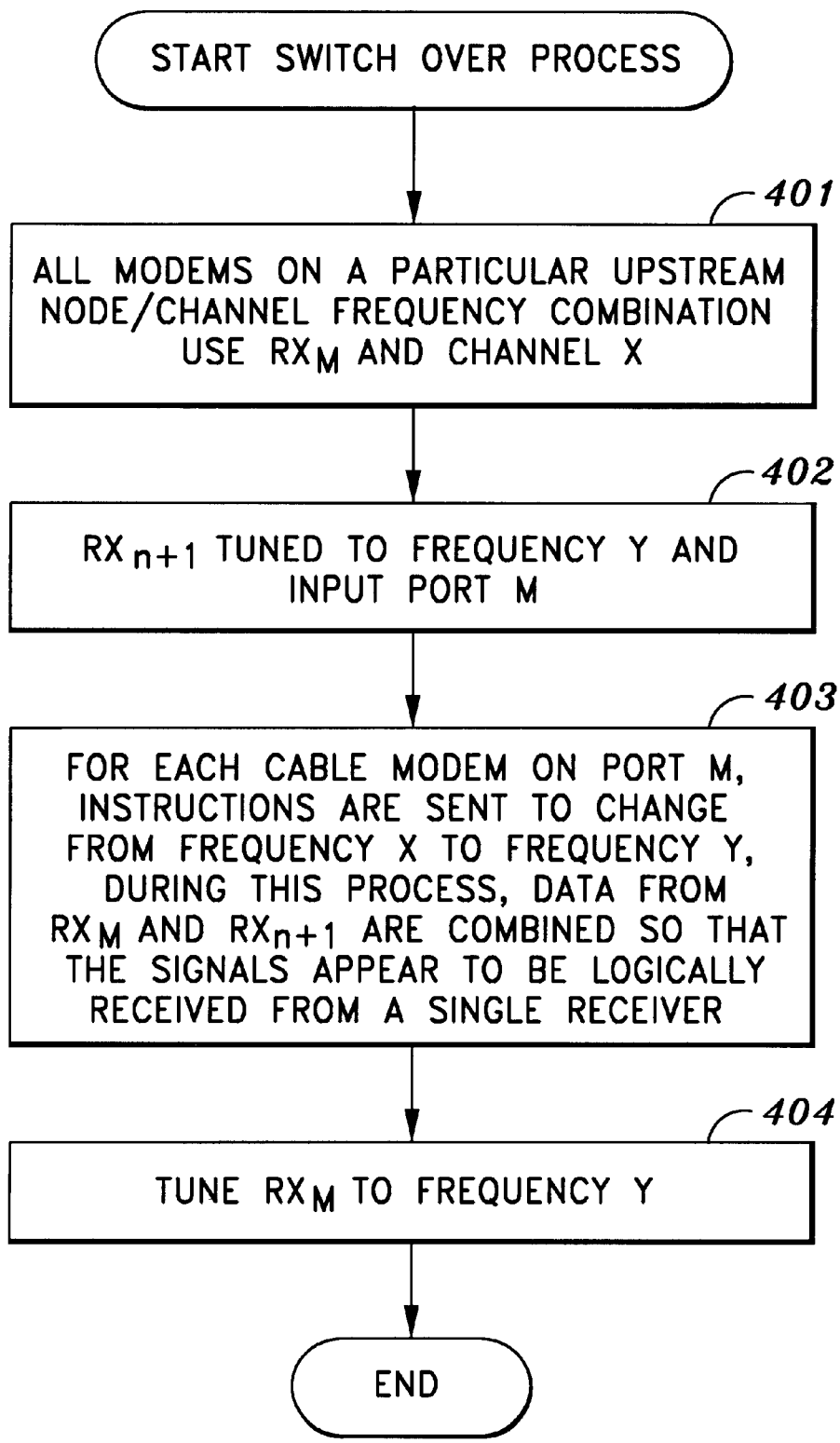
FIG. 4 is a flow diagram illustrating a switch over process.
Figure 5:
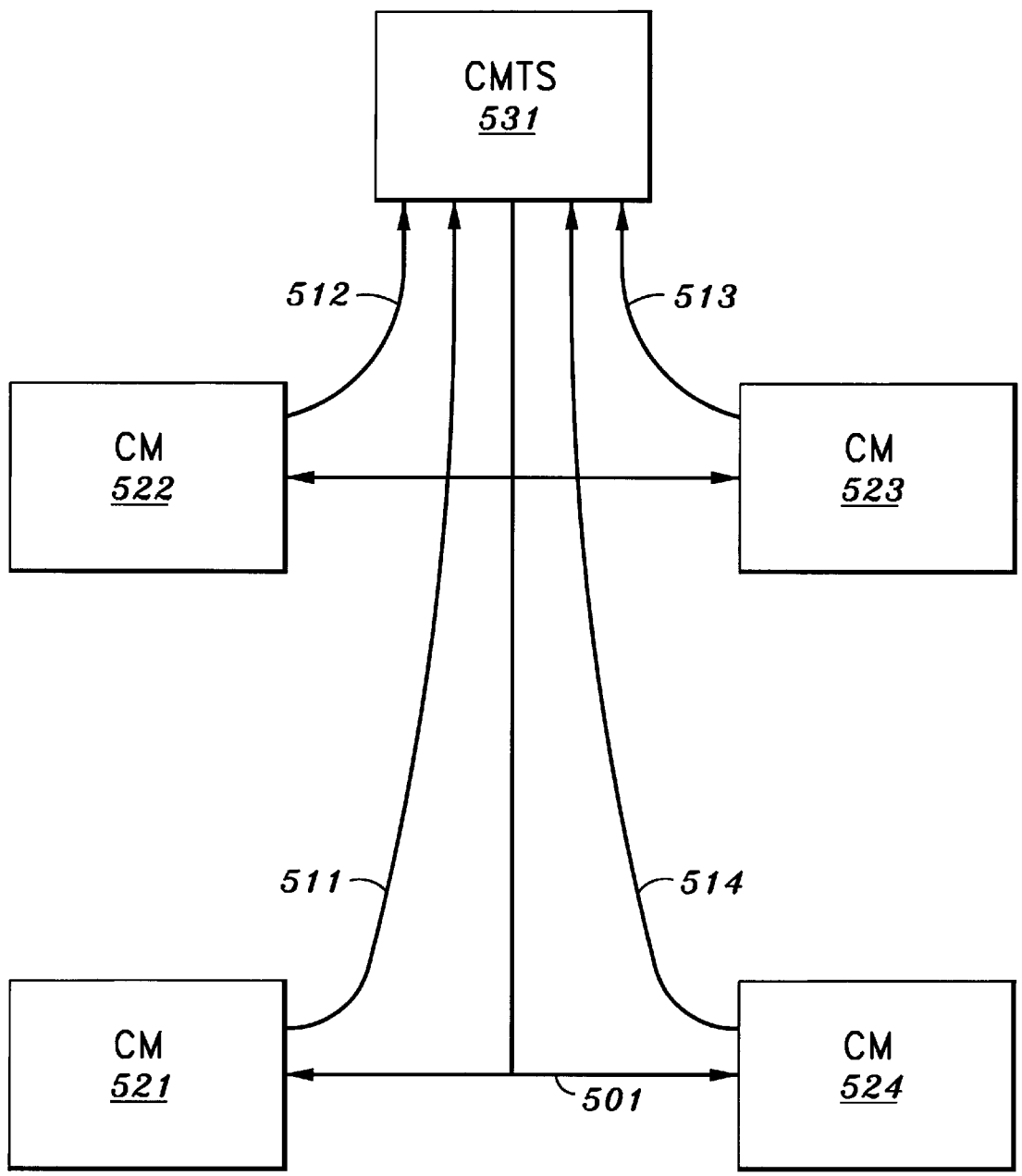
FIG. 5 is a high level diagram illustrating a prior art cable modem plant.

The receiver 306 may also be utilized to facilitate switchover of the cable modems 104A–Z from the old frequency to the new frequency, as will be further described in connection with FIG. 4. As shown by FIG. 4, all modems for a particular upstream node/channel frequency combination initially use receiver M which is receiving at frequency X. block 401. For purposes of this discussion, receiver M may be any of receivers 302A–C and input M may be any of inputs 301A–C dependent on which input is to be switched from one frequency to another.

When it is determined that it is desirable to change to a new frequency (e.g., based on high ingress on frequency Y), a new frequency is selected. This new frequency may be selected for example based on receiver 307 acting as a spectrum analyzer as discussed above and finding a frequency Y with lower ingress. In any event, receiver 307 is tuned to frequency Y, block 402. In this mode, switch 304 is set to switch through the input signal from the input M and switch 305 is set to switch through the input from switch 304.

For each of the cable modems connected on input M, instructions are sent by the CMTS 102 to the cable modem, during its time slot in the time division multiplexing communication scheme, to switch from frequency X to frequency Y, block 403. During this change over process, data from receiver 307 and the receiver M is combined so that the signals appear to be received from a single receiver. In this way, advantageously, the switch over process can be relatively transparent and does not require shutting down the cable plant in order to allow for the transition.

After all cable modems have been switched from frequency X to frequency Y, the receiver M may be reprogrammed to receive on frequency Y, block 404.

In the described embodiment, although not illustrated, the inputs of switch 304 are coupled through 10 dB taps to switch 304. The 10 dB tap passes the input signal unaltered to the output port (e.g., onto receivers 302A–C and passes the signal with 10 dB attenuation to the switch 304. It might also be noted that, although not shown in FIG. 3, each of the receivers 302A–C and 307 are coupled to additional circuitry in the CMTS 102 in a conventional manner.

Initialization of Cable Modems

In addition to the advantages of the N+1 receiver design described above, the "extra" receiver may be useful in the initialization of cable modems. As was discussed in the background section, constraints are imposed on the upstream channels by the MCNS specification in order to accommodate initialization of CMs.

The present invention proposes a method and apparatus for relieving some, if not all, of the constraints discussed above. In particular, it is proposed to provide a CMTS which is designed to eliminate initial maintenance burst types from UCDs which describe upstream channels used for ordinary data transmissions and to remove initial maintenance opportunities from allocation maps for those upstream channels. Thus, it will not be possible for the CM to initialize itself to use upstream channels which are used for ordinary data transmissions.

Figure 6:
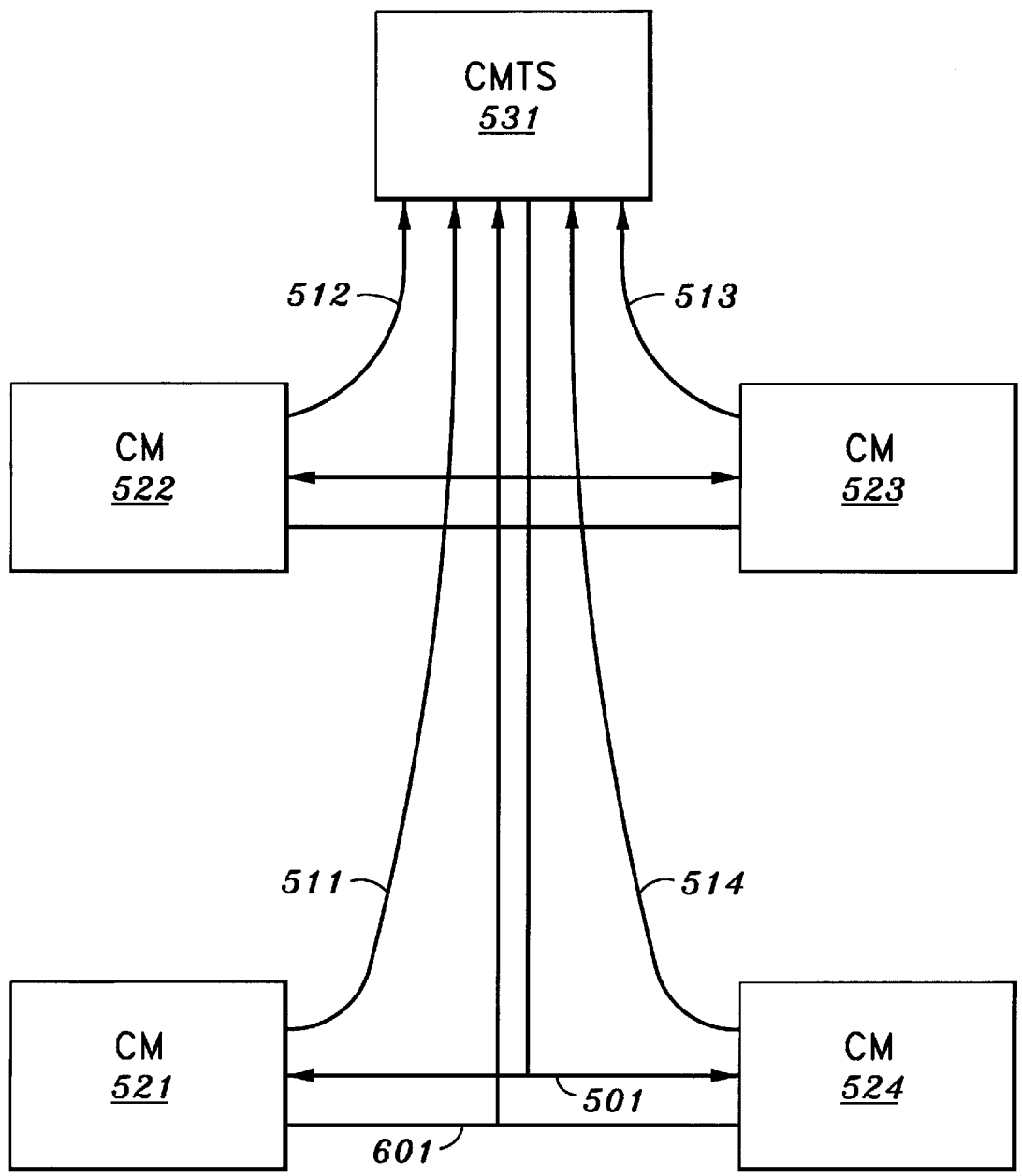
FIG. 6 is a high level diagram illustrating a cable modem plant as may implement the present invention.

Referring to FIG. 6, an illustration of a cable plant implementing an embodiment of the present invention is provided. In the illustrated embodiment, instead of providing UCD with initial maintenance burst types (and the associated allocation maps) designating channels 511–514, UCDs will be transmitted which describe particular channels ("management channels") for initial maintenance requests. The management channels may be used for other management functions in addition to being used for initial maintenance requests. In the figure a single management channel is illustrated, channel 601. In the described embodiment, the management channel is monitored by the N+1 receiver which was described earlier. Advantageously, the N+1 receiver may still carry out the other functions which have been described herein (e.g., spectrum analysis) because the cable modem system is a time division multiplexing system. Therefore, the CMTS can reliably predict during which time intervals it may be receiving ranging requests from the cable modems.

It should be noted that in alternative embodiments, each input port may utilize a second receiver and UCDs (and corresponding maps) may be transmitted which describe the frequency, etc. characteristics of the second receiver. In addition, receivers may be developed which allow for receiving simultaneously at several frequencies. An alternative embodiment may utilize such receivers and UCDs (and corresponding maps) may be issued describing frequency's etc. which are not normally used for data transmission.

By eliminating the initial maintenance burst types from UCDs which describe upstream channels for ordinary data transmissions and eliminating initial maintenance opportunities from allocation maps for ordinary data channels, CMs are forced to perform ranging requests in the channels chosen by an implementation operating in accordance with the teachings of the present invention.

In one embodiment, this "management channel" is relatively narrow (e.g., 200 KHz) and is at some relatively undesirable frequency such as 5 Mhz. However, in alternative embodiments, it may be at any frequency which may be received by the receiver.

Once the initial ranging, provisioning and registration of the CM is accomplished, the CM may be switched to a channel for normal data communication operation. In certain embodiments, it may be necessary to perform a second initial maintenance when switching to a different channel dependent at least in part in the variance of signal levels from channel to channel. In such an embodiment, it may be desirable to develop a mechanism to unicast or multicast ranging opportunities on the data channels in order to avoid re-imposing the constraints discussed above.

Figure 7:
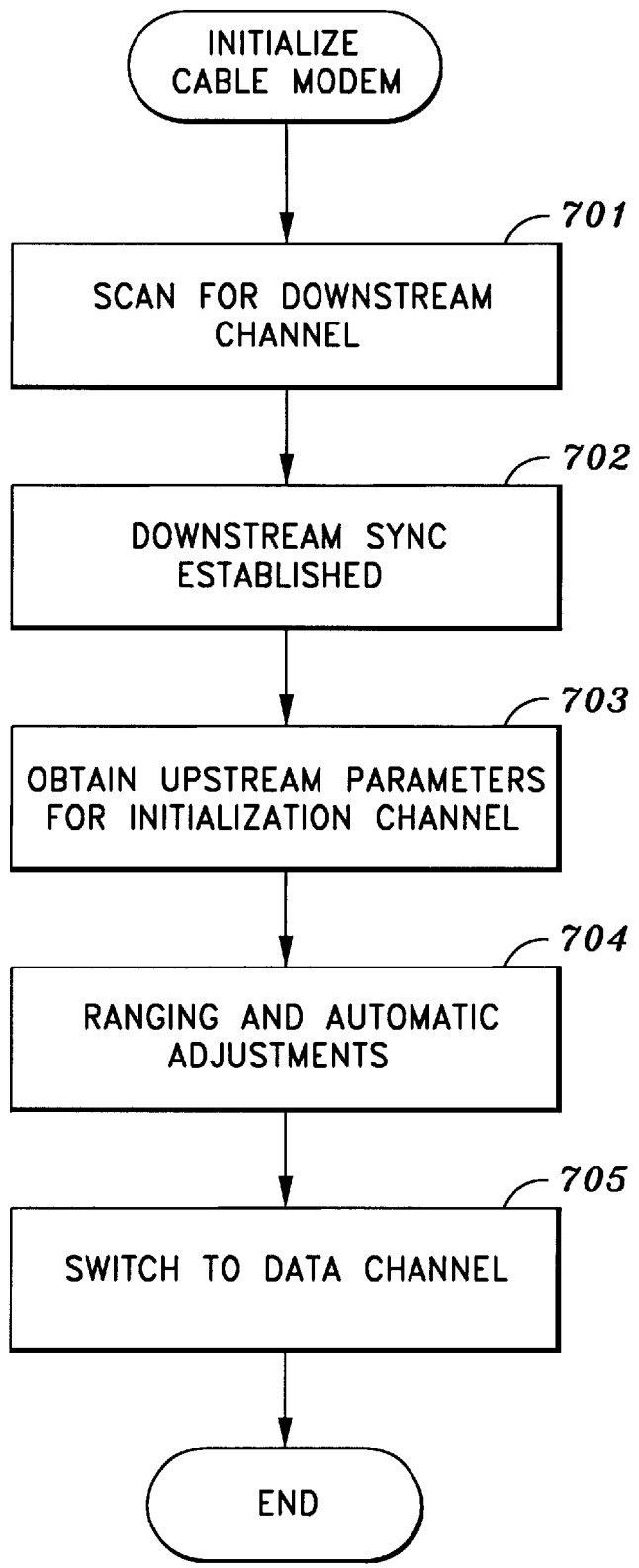
FIG. 7 is a flow diagram illustrating a method of initializing a modem as may be utilized by the present invention.

FIG. 7 provides an overview flowchart illustrating a method of initializing a cable modem as may be utilized by an embodiment of the present invention. Initially, as in prior art system, the cable modem is powered on and determines if there is a removable security module installed and then the cable modem acquires the downstream channel, block 701. Acquisition of the downstream channel is described in greater detail in the MCNS specification. Downstream synchronization is established, block 702.

The CMTS is periodically generating UCD messages on the downstream channel. As has been discussed, as one aspect of the present invention, UCD messages for ordinary data transmission channels do not include an initial maintenance burst type; UCD messages including initial maintenance burst types are only transmitted for management channels.

The cable modem listens for a UCD message which includes an initial maintenance burst type and when it detects one it obtains the upstream parameters for the management channel, block 703. The CM then carries out normal ranging and other initialization over the management channel, block 704. After completion of initialization, the CMTS notifies the CM to switch to a data channel.

Thus, what has been disclosed is a method and apparatus for initialization of cable modems.

What is claimed is:

1. A method of initializing cable modems comprising:

a cable modem termination system transmitting on a downstream channel messages providing upstream management channel information for an upstream management channel, the upstream management channel being designated as a channel to be used by a cable modem for transmitting an initialization request to the cable modem termination system; and the cable modem termination system receiving the initialization request from the cable modem via the upstream management channel; and upon completion of initialization of the cable modem, the cable modem termination system notifying the cable modem to switch to a data channel for upstream data transmission wherein the cable modem termination system has N upstream data channels and N+1 upstream receivers and wherein the initialization request is received on the N+1 upstream receiver.

2. The method of claim 1 further comprising:

the cable modem termination system transmitting data channel initialization information to the cable modem for the data channel.

3. The method of claim 1 wherein the cable modem termination system broadcasts the upstream management channel information.

4. The method of claim 2 wherein the cable modem termination system multicasts the data channel initialization information.

5. The method of claim 2 wherein the cable modem termination system unicasts the data channel initialization information.

6. The method of claim 1 wherein the upstream management channel information is transmitted in upstream channel descriptors and allocation maps.

7. The method of claim 1 wherein the initialization request is a ranging request.

8. A cable modem termination system comprising:

a plurality of receiver circuits coupled to a plurality of inputs;

a first switch coupled to the plurality of inputs and an extra input, the first switch to switch through either one of the plurality of inputs or the extra input;

a second switch coupled to an output of the first switch and the extra input, the second switch to switch through either the output of the first switch or the extra input; and an extra receiver circuit coupled to receive an output of the second switch.

9. The cable modem termination system of claim 8 wherein the extra receiver circuit is configured to function as a diagnostic receiver.

10. The cable modem termination system of claim 8 wherein the extra receiver circuit is configured to function as a backup receiver when one of the plurality of receiver circuits fails.

11. The cable modem termination system of claim 8 wherein the extra receiver circuit is configured to function as a spectrum analyzer.

12. The cable modem termination system of claim 8 wherein the extra receiver is utilized to allow a cable modem connected to the cable modem termination system to switch from a first frequency to a second frequency.

\* \* \* \* \*